US007535262B2

(12) United States Patent
Abdoulin

(10) Patent No.: US 7,535,262 B2
(45) Date of Patent: May 19, 2009

(54) HIGH VOLTAGE LEVEL SHIFTING BY CAPACITIVE COUPLING

(75) Inventor: Edgar Abdoulin, Woodland Hills, CA (US)

(73) Assignee: International Rectifier Corporation, El Segundo, CA (US)

( * ) Notice: Subject to any disclaimer, the term of this patent is extended or adjusted under 35 U.S.C. 154(b) by 0 days.

(21) Appl. No.: 11/252,902

(22) Filed: Oct. 18, 2005

(65) Prior Publication Data

US 2006/0087470 A1    Apr. 27, 2006

Related U.S. Application Data

(60) Provisional application No. 60/619,970, filed on Oct. 19, 2004.

(51) Int. Cl.
*G01R 19/00* (2006.01)
(52) U.S. Cl. .............................. 327/58; 327/61; 327/333
(58) Field of Classification Search .................. 327/58, 327/61, 62, 65, 69, 78, 333, 390
See application file for complete search history.

(56) References Cited

U.S. PATENT DOCUMENTS

| | | | | |
|---|---|---|---|---|
| 4,748,419 A | * | 5/1988 | Somerville | 330/10 |
| 4,835,486 A | * | 5/1989 | Somerville | 330/10 |
| 5,003,196 A | * | 3/1991 | Kawaguchi | 327/62 |
| 5,300,820 A | * | 4/1994 | Sayama et al. | 327/165 |
| 5,311,493 A | * | 5/1994 | Fuji | 369/59.18 |
| 5,444,600 A | * | 8/1995 | Dobkin et al. | 361/303 |
| 5,541,502 A | * | 7/1996 | Hoffmann | 324/103 P |
| 5,631,891 A | * | 5/1997 | Moritsugu et al. | 369/124.11 |
| 5,649,311 A | * | 7/1997 | Somei | 455/188.1 |
| 5,654,984 A | * | 8/1997 | Hershbarger et al. | 375/257 |
| 6,137,827 A | * | 10/2000 | Scott et al. | 375/219 |
| 6,297,618 B2 | * | 10/2001 | Emori et al. | 320/132 |
| 6,381,270 B1 | * | 4/2002 | Lydon et al. | 375/230 |
| 6,389,063 B1 | * | 5/2002 | Kanekawa et al. | 375/222 |
| 6,603,807 B1 | * | 8/2003 | Yukutake et al. | 375/222 |
| 6,611,051 B2 | * | 8/2003 | Akiyama et al. | 257/685 |
| 6,781,422 B1 | | 8/2004 | Yang | |
| 6,819,169 B1 | * | 11/2004 | Kunc et al. | 327/560 |
| 6,973,153 B1 | * | 12/2005 | McLellan | 375/377 |
| 2006/0238527 A1 | * | 10/2006 | Walker et al. | 345/204 |

OTHER PUBLICATIONS

First Notification of Office Action in corresponding Chinese Application No. 200580035443.3 issued Oct. 31, 2008.

* cited by examiner

*Primary Examiner*—Lincoln Donovan
*Assistant Examiner*—Thomas J Hiltunen
(74) *Attorney, Agent, or Firm*—Ostrolenk, Faber, Gerb & Soffen, LLP

(57) ABSTRACT

A circuit configuration which includes an input circuit referenced to one ground voltage and an output circuit referenced to another ground voltage capacitively coupled to the input circuit.

10 Claims, 8 Drawing Sheets

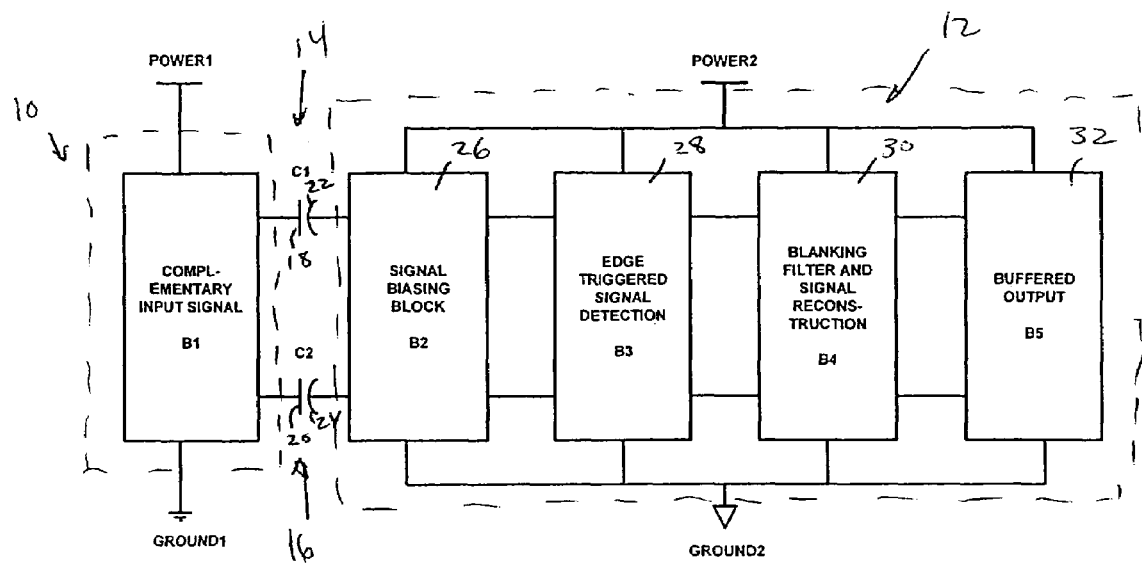
Figure1. Top Level Block Diagram
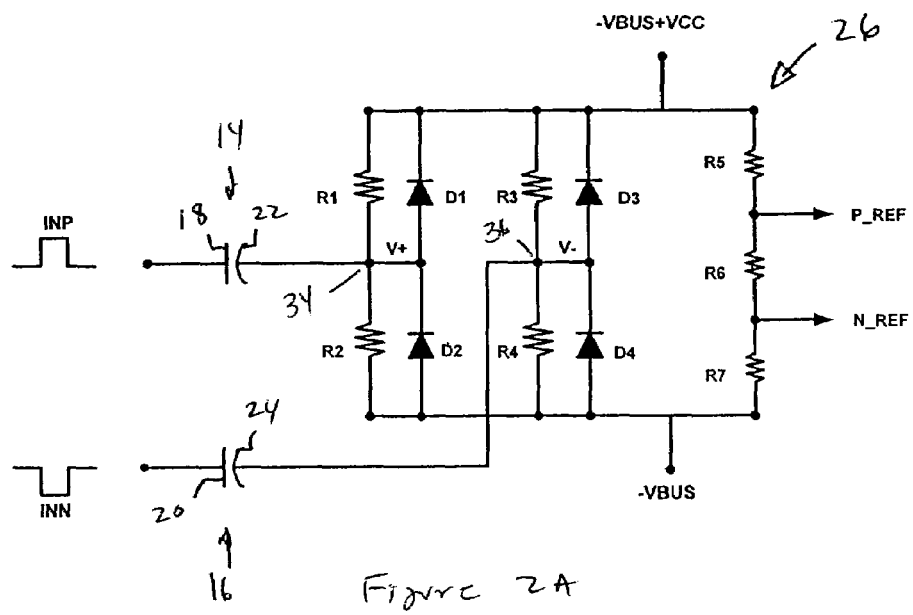
Figure 2A

Differential Mode

HIGH VOLTAGE LEVEL SHIFTING BY CAPACITIVE COUPLING

RELATED APPLICATION

This application is based on and claims the benefit of U.S. Provisional Application No. 60/619,970, filed on Oct. 19, 2004, entitled Capacitive Coupled High Voltage Level Shifting Scheme, to which a claim of priority is hereby made and the disclosure of which is incorporated by reference.

BACKGROUND OF THE INVENTION

The present invention relates to high voltage level shifting methods and circuits.

High voltage signal (up to several hundred volts) level shifting is an essential part of a modern power system. A high voltage signal level shifting scheme needs to provide isolation between the control signal and the switching power output. Conventionally, high voltage level shifting is realized through proprietary high voltage junction isolation technology, Hall Effect sensors or through optical isolation devices. All of these approaches disadvantageously have long propagation delays and low operating speeds. Emerging applications and system architectures, however, require high operation speeds, e.g. in the mega hertz range.

Furthermore, Hall Effect sensors or optical isolation devices are bulky, and not integratable on a chip. Moreover, conventional high voltage junction isolation (HVJI) technology is not compatible with standard low voltage CMOS technology and requires extra process steps, peripheral conditioning circuits, or multi step level shifting when signals are level shifted between two non-earth grounds.

In a conventional half bridge drive system, the DC bus is configured such that the negative DC bus voltage is at zero voltage. In a recent application, the DC bus is constructed as a split supply, which means the mid point of the DC bus is at zero voltage. In another recent application, the DC bus is configured as a floating split DC supply. For these two types of DC bus configurations, the conventional HVJI will require multi-step high voltage level shifting when input is at zero voltage, additional high voltage DC supply to hold the substrate to negative DC bus, additional input supply which is referenced to zero voltage.

SUMMARY OF THE INVENTION

It is an object of the present invention to provide a high voltage level shifting scheme that does not suffer from the disadvantages of the prior art.

A circuit according to the present invention includes an input circuit that is referenced to a first ground, and an output circuit which is referenced to another ground. The input circuit is capacitively coupled to the output circuit by at least one capacitor.

In the preferred embodiment of the present invention, the input circuit provides complementary input signals. Each one of the complementary input signals is coupled to the input plate of a respective capacitor, and the output plate of each capacitor is coupled to the output circuit. The input plate and the output plate of each capacitor are insulated from one another by the capacitor dielectric, thereby providing ohmic isolation between the input circuit and the output circuit. However, due to charge transfer between the input plate and the output plate, input signals from the input circuit can be used to reconstruct an output signal. The output signal can then be used to operate a power semiconductor device such as a power MOSFET. For example, the output signal can be supplied to the drive stage of a driver circuit which then drives the gate of a power MOSFET, IGBT or the like.

An output circuit according to the present invention is capable of distinguishing the change of voltage at the output plates of the capacitors due to charge transfer caused by input signals from voltage changes due to noise such as common mode noise. Thus, the output circuit according to the present invention is immune from noise-related misoperation.

Thus, a circuit according to the present invention integrates the capacitive coupling concept with fully differential signal processing. Advantageously, the signals at both sides of the capacitor can be referenced to any floating ground up to several hundred volts. Moreover, a level shifting scheme according to the present invention is a single step level shifting scheme for both the fixed or floating DC supply configurations and does not require additional power supplies.

Preferably, an output circuit according to the present invention is monolithically integrated with an integrated driver IC. Such a device can be fabricated using standard CMOS fabrication methods. A monolithic device according to the present invention can possibly provide signal level shifting up to several hundred volts with operating speed as high as 5 MHz, common mode noise immunity up to 50V/ns, and IC propagation delay as low as 50ns.

Other features and advantages of the present invention will become apparent from the following description of the invention which refers to the accompanying drawings.

BRIEF DESCRIPTION OF THE DRAWING(S)

FIG. 1 illustrates a top level block diagram of a level shifting scheme according to an embodiment of the present invention.

FIG. 2A illustrates a signal biasing circuit according to the preferred embodiment of the present invention.

DETAILED DESCRIPTION OF THE FIGURES

Figure 2B:
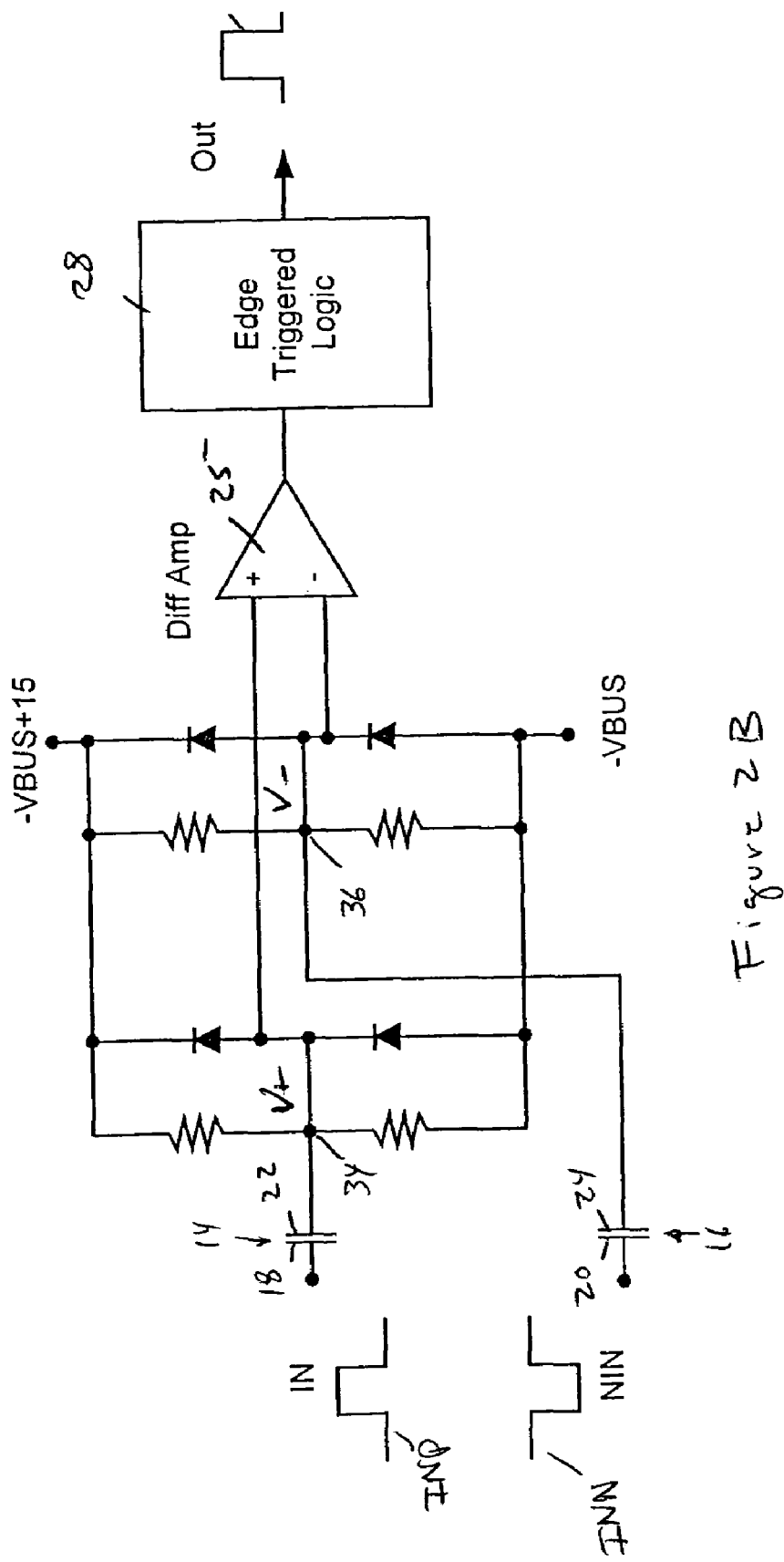
FIG. 2B illustrates the cooperation of the signal biasing circuit with the edge triggered logic portion of a circuit according to the preferred embodiment of the present invention.

Referring to FIG. 1, a circuit arrangement according to an embodiment of the present invention includes input circuit 10 which is referenced to ground 1 and power 1, and output circuit 12 which is referenced to ground 2' and power 2. Input circuit 10 may be any micro-controller that is capable of generating a control signal. In the preferred embodiment of the present invention input circuit 10 is capable of generating complementary signals; i.e. signals of opposite polarity.

According to an aspect of the present invention, input circuit 10 and output circuit 12 are capacitively coupled to one another by at least one capacitor. In the preferred embodiment, two capacitors 14, 16 are used to capacitively couple input circuit 10 and output circuit 12. Specifically, input plate 18 of capacitor 14, and the input plate 20 of capacitor 16 are connected to input circuit 10, while output plate 22 of capacitor 14 and output plate of capacitor 16 are electrically connected to output circuit 12. Thus, input circuit 10 and output circuit 12 are capacitively coupled, while ohmically insulated from one another. As a result, input circuit 10 and output circuit 12 can be referenced to different ground voltages.

Output circuit 12 preferably includes signal biasing portion 26, edge triggered signal detection portion 28, blanking filter and signal reconstruction portion 30, and buffered output portion 32. Preferably, output circuit 12 is implemented as an integrated circuit (IC) on a single, monolithic semiconductor die. Signal biasing block 26 is electrically connected to output plate 22 of capacitor 14, and output plate 24 of capacitor 16.

Referring specifically to FIG. 2A, when a positive input signal INP is received by input plate 18, the voltage of output plate 22 of capacitor 14 rises in the positive direction temporarily. When positive input signal INP is off, the voltage of output plate 22 decreases in the negative direction temporarily. Similarly, when a negative input signal INN is received by input plate 20 the voltage of output plate 24 changes in the negative direction temporarily, and when negative input signal INN is turned off, the voltage of output plate 24 changes in the positive direction temporarily. The temporary changes of voltage at the output plates 22,24 are due charge transfer.

FIG. 2A illustrates the biasing scheme for nodes V+34 and V−36 which are usually referencing to the switching ground 2. D1, D2, D3 and D4 are zener diodes which will keep V+node 34 and V−node 36 on track with POWER2 and GROUND2. R1, R2, R3 and R4 provide the proper DC level for V+node 34 and V−node 36. R5, R6 and R7 bias the DC voltages for V+node 34 and V−node 36 to generate power voltage references P_REF and N_REF for subsequent signal processing so that the reference voltages track with the DC voltages on V+node 34 and V−node 36. P_REF and N_REF track with the voltage of V+node 34 (V+) and the voltage of V−node 36 (V−).

Output plate 22 is connected to V+node 34, while output plate 24 is electrically connected to V−node 36. The change of voltage at output plate 22 results in the change of voltage at V+node 34, while the changes of voltage at output plate 24 results in the change of voltage at V−node 36. Referring to FIG. 2B, a differential comparator 25 can then be used to detect the changes in voltage of V+node 34 and V−node 36 and generate logic signals, which are then used to determine the beginning and the end edge of each input signal INP, INN; i.e. the rising edge and the falling edge of positive input signal INP respectively, and the falling edge and rising edge respectively of negative input signal INN. In addition to generating logic signals based on changes of voltage due to input signals, signal biasing block may generate logic signals based changes of voltage at V+node 34 and V−node 36 due to noise, such as common mode noise.

Logic signals generated by signal biasing portion 26 are received by edge triggered signal detection portion 28, which by performing logic operations distinguishes the logic signals that are related to the positive and negative input signals, from logic signals related to noise, and in response generates signals for the reconstruction of the input signals received. Specifically, edge triggered signal detection portion 28 generates a set signal in response to the beginning of the negative and positive input signals INP,INN, and generates a reset signal in response to the detection of the end of the positive and negative input signals INP, INN.

Blanking filter and signal reconstruction portion 30 receives the set signal and in response generates an output voltage, and when it receives the reset signal it turns off the output voltage, whereby the input voltage is reconstructed. It should be noted that a blanking filter included with blanking filter and signal reconstruction portion 30 is used to delay the generation of the set and the reset signals in order to filter out noise. Furthermore, the blanking filter of blanking filter and signal reconstruction portion 30 rejects any differential mode noise due to component or signal mismatch or differential mode signals that originate from common mode noise due to different parasitic paths. The reconstructed signal is then supplied through buffered output portion 32 to a drive stage such as a drive stage for driving a power semiconductor device; e.g. a power MOSFET.

Figure 3:
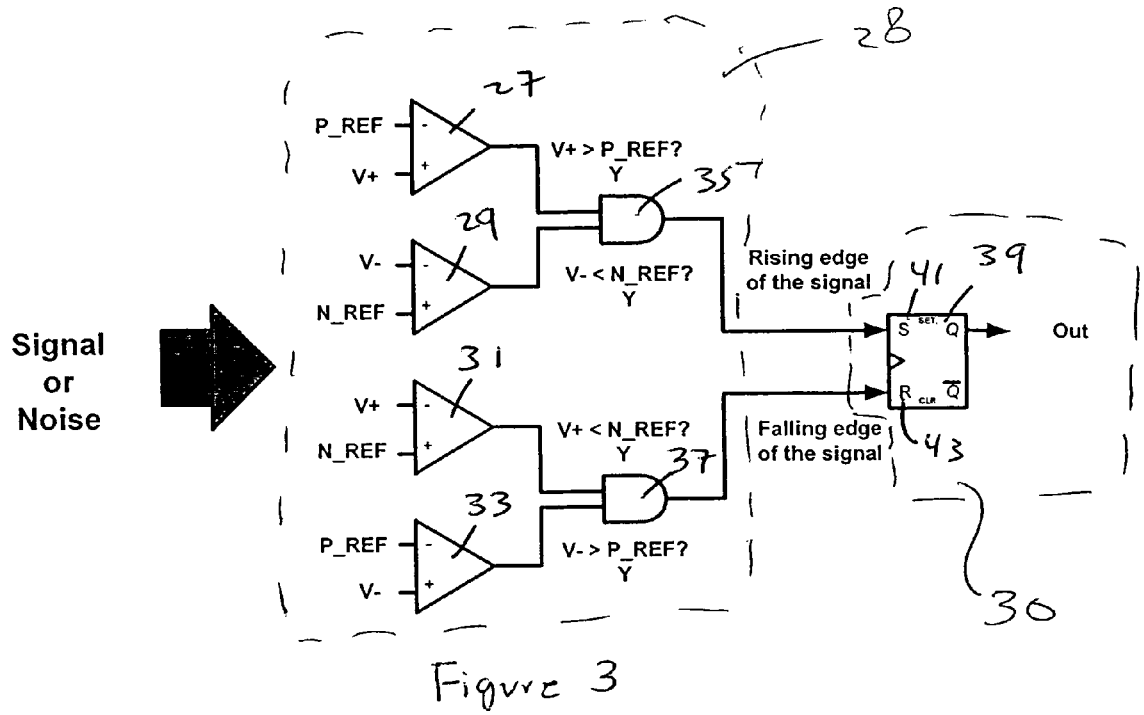
FIG. 3 illustrates a circuit for edge triggered signal reconstruction in a circuit according to the preferred embodiment.

Referring to FIG. 3, the beginning and end of input signals INP, INN are determined as follows. If it is determined that V+>P_REF and V−<N_REF, then it is concluded that the signal received is the beginning of the input signals INN, INP, and a set signal is generated. If it is determined that V+<N_REF and V−>P_REF, then it is concluded that the signal received is the end of input signals INN, INP, and a reset signal is generated. If these conditions are not met, then no signal is generated. As a result, voltage changes at output plates 22, 24 due to noise will not be recognized. That is, effectively, noise will be distinguished from genuine input signals.

Specifically, comparator 27 determines whether V+>P_REF and generates a high signal if so, and comparator 29 determines whether V−<N_REF and generates a high signal if so. And gate 35 then generates a high signal if it receives two high signals from comparator 27 and comparator 29, which signal is received by at set terminal 41 of latch circuit 39. Responsive to the set signal, latch circuit 39 latches on thus generate an output signal, which can then be coupled to a drive stage. Similarly, comparator 31 determines whether V+<N_REF and if so generates a high signal, and comparator 33 determines whether V−<N_REF and if so generates a high signal. And gate 37 then generates a high signal when it receives two high signals from comparators 31, 33, which is received at reset terminal 43 of latch circuit 39. Upon receiving a high signal at its reset terminal 43, latch circuit 39 turns off the output signal.

Figure 4:
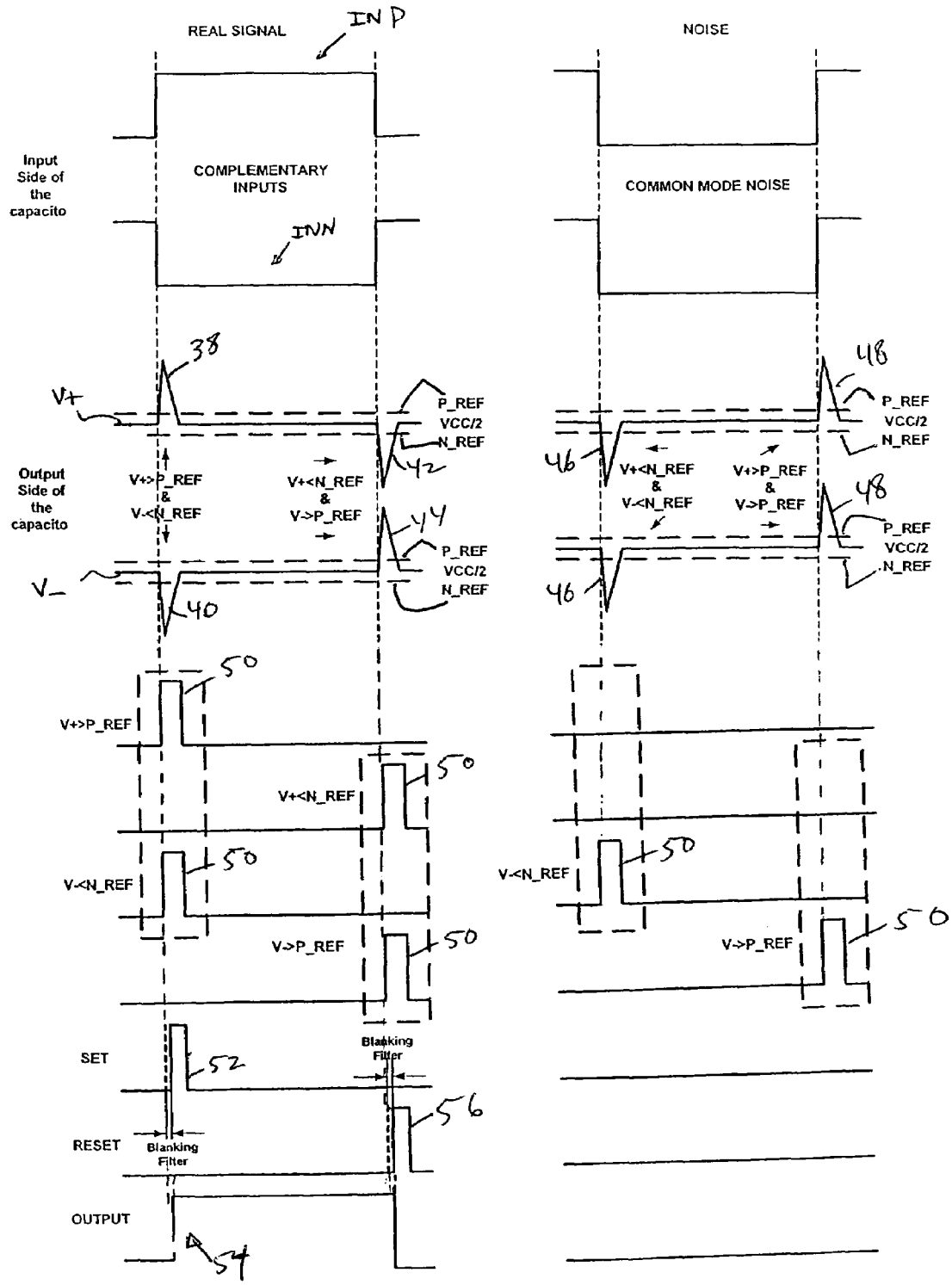
FIG. 4 illustrates the signal reconstruction and noise blocking schemes according to the present invention.

Referring to FIG. 4, when input circuit 10 generates positive input signal INP voltage on input plate 18 of capacitor 14 becomes positive, which marks the beginning of positive input signal INP. Similarly, when input circuit 10 generates negative input signal INN voltage on input plate 20 of capacitor 16 becomes negative, which marks the beginning of negative input signal INN. As a result of the change in voltage of input plates 18, 20, the voltage of the corresponding output plates 22, 24 also changes temporarily. Specifically, voltage 38 of output plate 22 becomes positive, while voltage 40 of output plate 24 becomes negative.

On the other hand, at the end of positive input signal INP the voltage of input plate 18 shifts toward negative, and at the end of negative input signal INN the voltage of input plate 20 shifts toward positive. Consequently, the voltage 42 of output plate 22 shifts toward negative, and the voltage 44 of output plate 24 shifts toward positive.

When there is noise, or common mode noise at input plates 18, 20, the shifting of the voltage toward negative results in the shifting of the voltage 46 at output plates 22, 24, and the shifting of the voltage of input plates 18, 20 toward positive results in the shifting of the voltage 48 of output plates 22, 24 toward positive.

According to the present invention, a logical operation can determine whether the changes in voltage at the output plates 22, 24 relates to input signals INP, INN, or noise. Specifically, if it is determined that V+>P_REF, V−<N_REF, V+<N_REF, or V_>P_REF comparator 25 generates a signal 50. If it is determined that V+<N_REF, or V+>P_REF, no signal is generated by Comparator 25. When it is determined that V+>P_REF and V_<N_REF, then a set signal 52 is generated by edge triggered signal detection portion 28. Set signal 52 represents the beginning of input signals INP, INN and results in the start of output signal 54 from latch circuit 39. When it is determined that V+<N_REF and V−>P_REF, then reset signal 56 is generated. Reset signal 56 marks the end and causes the turning off of output signal 54. As a result, an output signal 54 is generated. It should be noted that blanking filter of blanking filter and signal reconstruction portion 30 may cause a slight time shift in the generation of output signal 54.

When the conditions set forth above are not met, neither a set signal 52, nor a reset signal 56 is generated. Thus, noise and common mode noise are effectively blocked. Specifically, when V+<N_REF and V−<N_REF no reset signal 52 is generated. Similarly, when V+>P_REF and V−>P_REF no rest signal 56 is generated. Thus, no output signal 54 is generated.

The output generated by output circuit 12 can be then used to operate a power semiconductor device, such as a power MOSFET.

Figure 5:
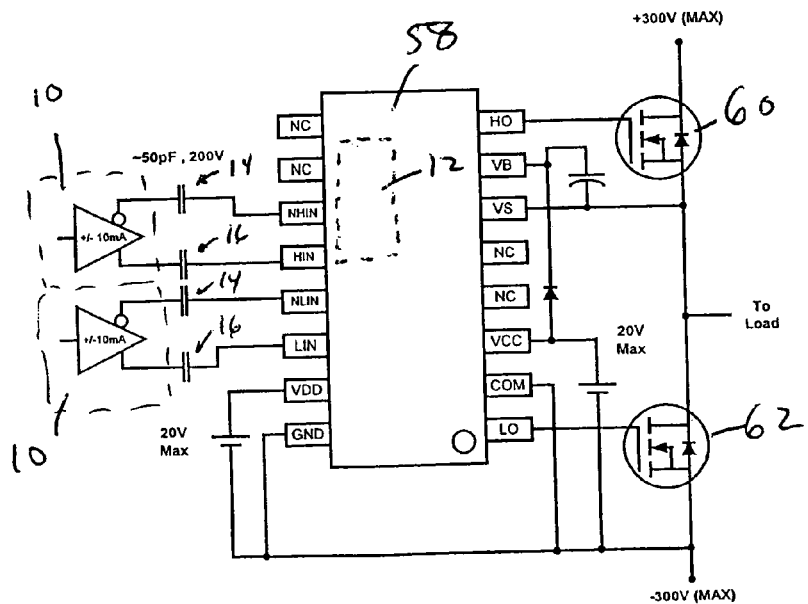
FIG. 5 illustrates schematically a preferred application of a circuit according to the present invention.

Referring to FIG. 5, in one embodiment, set signal 52, and reset signal 56 can be received by the drive stage of a driver IC 58, which is configured to drive one or more power MOSFETs. For example, driver IC 58 which is configured for driving a high side power MOSFET 60, and a low side power MOSFET 62, in a half-bridge configuration, can be modified to include an output circuit 12 according to the present invention. Thus, output circuit 12 according to the present invention can be combined with a driver circuit and implemented as an integrated circuit on a monolithic semiconductor die. A suitable driver IC 58, which can be modified to include an output circuit 12 according to the present invention, is IR2112, which is a high and low side driver sold by the assignee of the present invention, the operation of which is discussed in U.S. Pat. NO. 5,514,981, incorporated by reference. It should be noted that the values shown in FIG. 6 are examples only, and a skilled person would understand that the values shown can be changed as desired without deviating from the scope and the spirit of the present invention.

Figure 6:
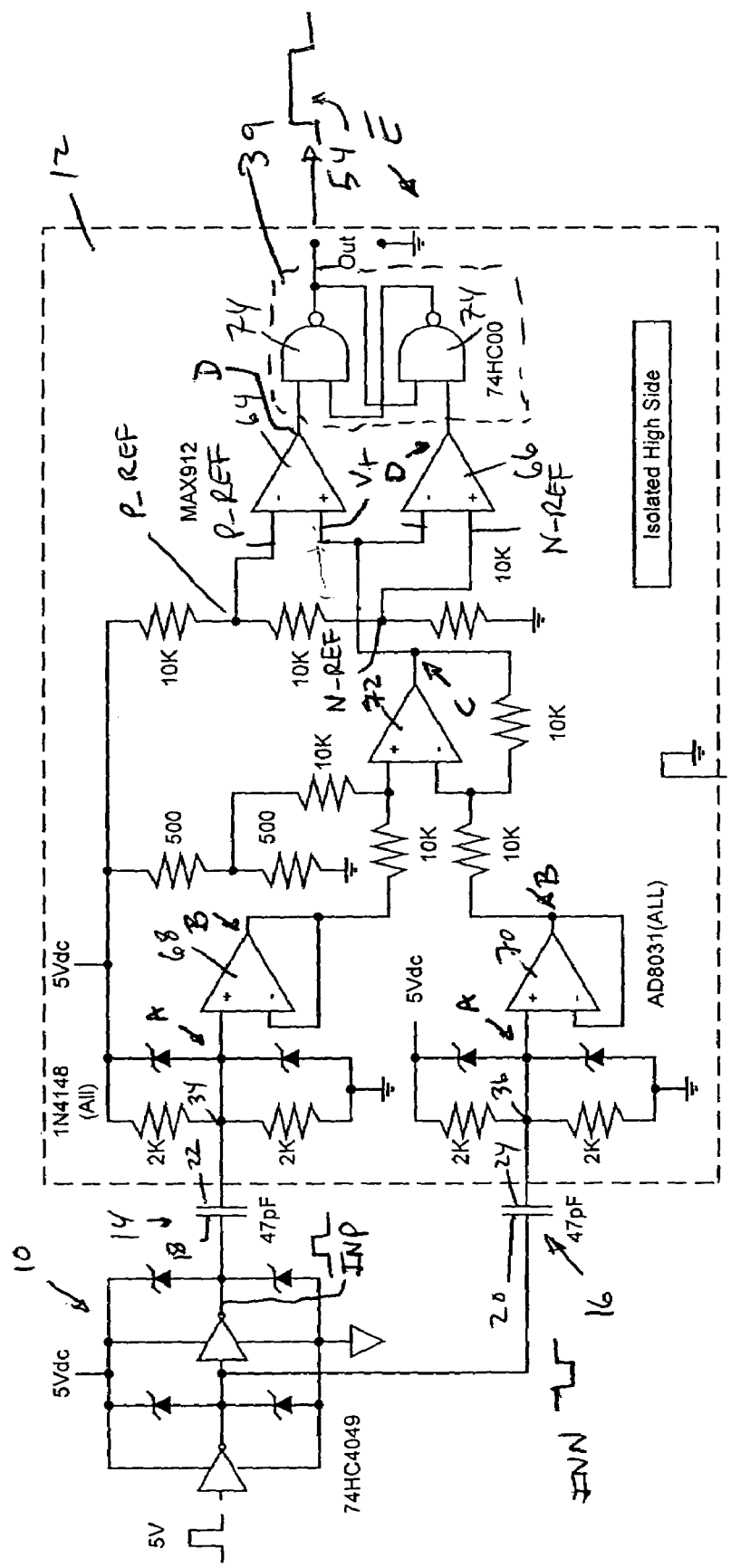
FIG. 6 illustrates another embodiment of the present invention.

Referring to FIG. 6, in output circuit 12 according to the second embodiment of the present invention, P_REF is received by comparator 64, and N_REF is received by comparator 66. Buffer 68 is connected to V+node 34, and buffer 70 is connected to V−node 36, and each buffer 68, 70 is connected to OP Amp 72 as shown.

It should be noted that the values of resistors shown in FIG. 6 are examples only, and can be varied as desired without deviating from the present invention. The output of OP Amp 72 is connected as shown to comparators 64, 66, whereby the changes of voltage of output plates 22, 24 can be compared to P_REF and N_REF in order to identify the beginning and end of input signals INP, INN. Specifically, if it is determined that V+>P_REF and V−<N_REF, a set signal is sent to latch circuit 39 (which may be formed by a pair of by cross-coupled NAND gates 74) whereby an output signal 54 is generated. If it is determined that V+<N_REF and V−>P_REF, a reset signal is sent to latch circuit 39 which indicates the end of input signals INP, INN and turns output signal 54 off. The output signal so generated is received by the driver stage of driver IC 58 which in turn provides a gate drive signal to a power semiconductor device.

Referring now to FIGS. 6, 7A-7E, at point A (FIG. 7A), voltage 38 on output plate 22 rises, and voltage on output plate 24 declines when input signal INP and INN are received at input plate 22 and input plate 20, respectively. Also, voltage at output plate 22 declines and voltage at output plate 24 rises upon termination of input signal INP and input signal INN, respectively.

At point B (FIG. 7B) output 68' of buffer 68 and output 70' of buffer 70 are shown and contrasted with voltage changes of the output plates.

Figure 7A:
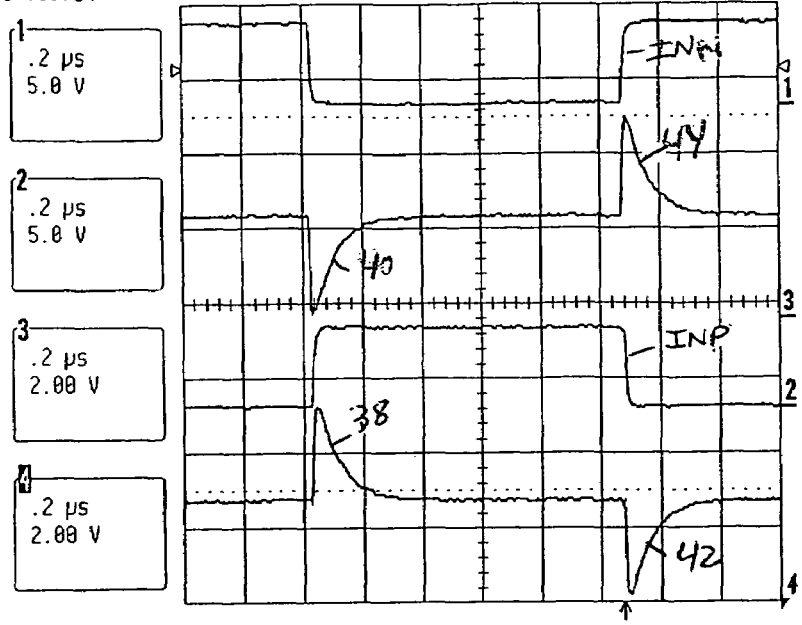
FIGS. 7A-7E illustrate the signal reconstruction scheme as implemented in a circuit according to the second embodiment.
Figure 7B:
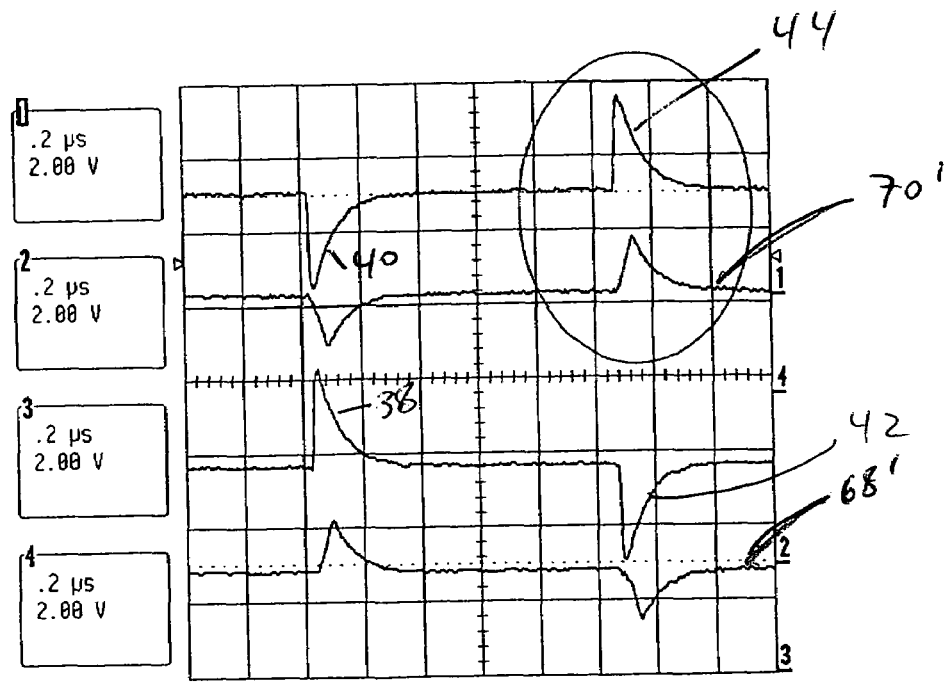
Figure 7C:
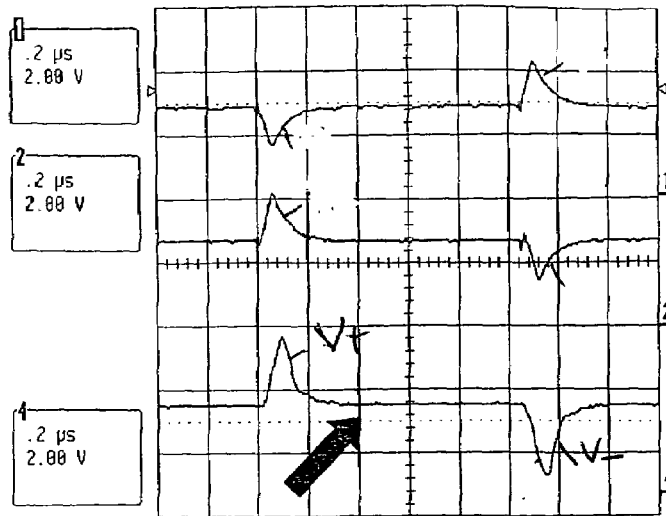
Figure 7D:
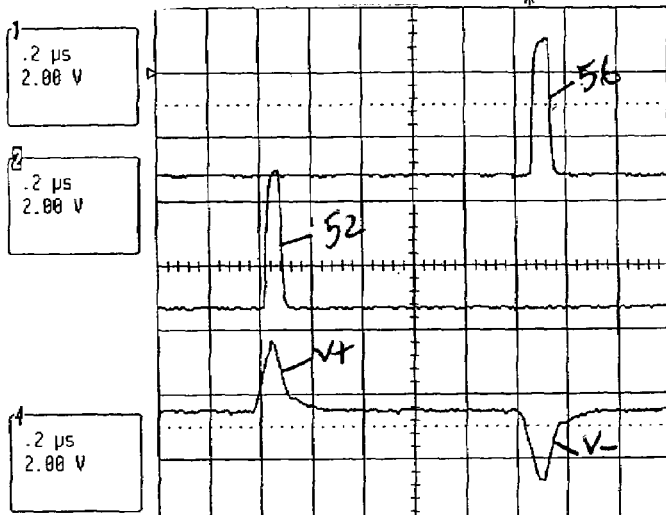
Figure 7E:
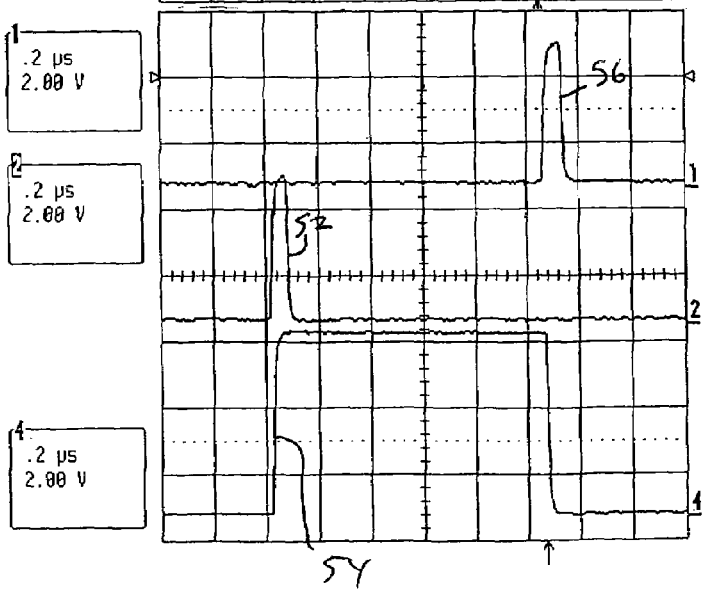

At point C (FIG. 7C), the output of buffers 68, 70 are received by Op Amp 72, which in turn generates V+ and V− signals indicative of the beginning and the end of input signals INP, INN, respectively. Next, at point D (FIG. 7D) logical operations by comparators 64, 66 produce a set signal 52, and reset signal 56. Thereafter, latch circuit 39 generates output signal 54 as seen in FIG. 7E.

Figure 8A:
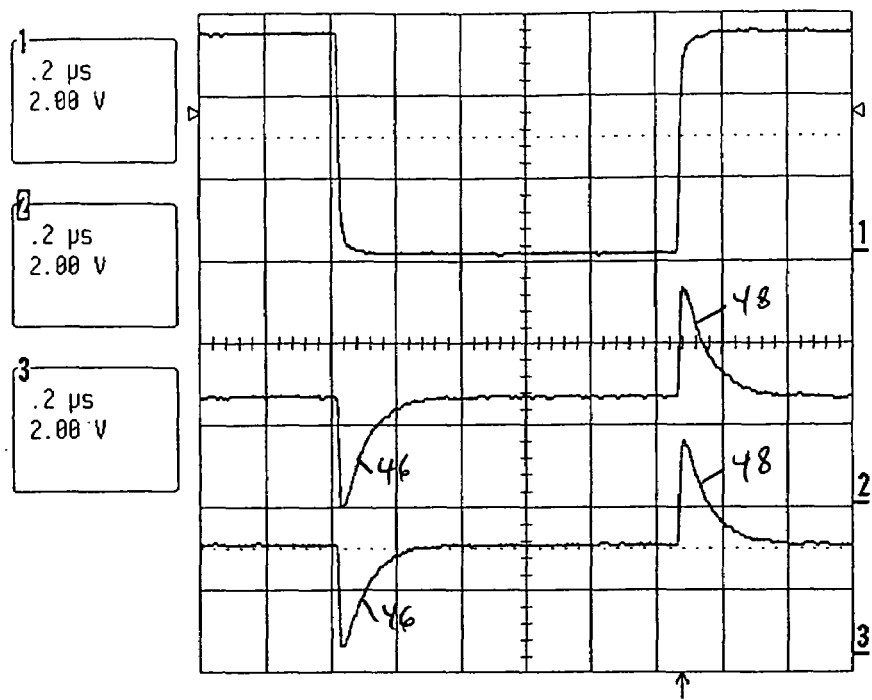
FIG. 8A and 8B illustrate the noise blocking scheme as implemented in a circuit according to the second embodiment.
Figure 8B:
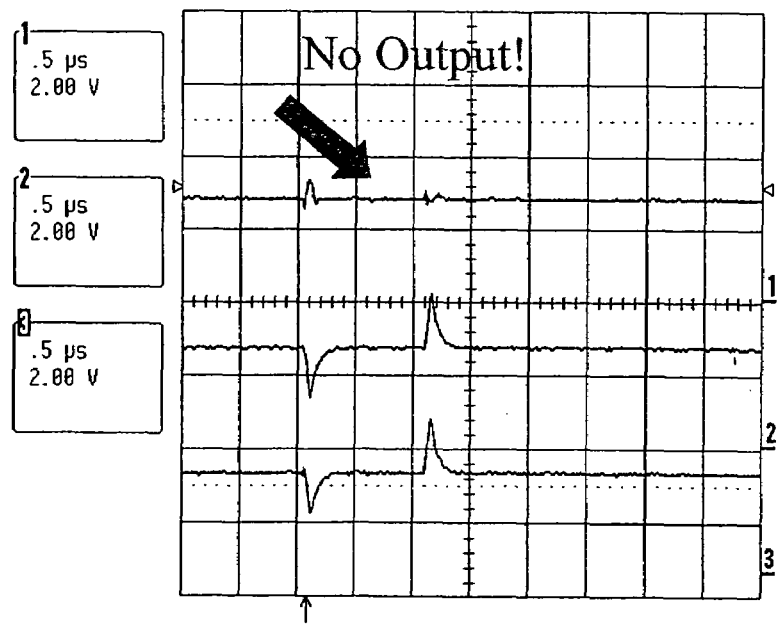

Referring now to FIGS. 8A and 8B, a signal due to noise, results in voltage changes in the same direction at the output plates 22, 24 (FIG. 8A). Responsive to such a signal combination Op Amp 72 does not generate a signal, thereby effectively blocking the eventual generation of an output signal by output circuit 12.

FIG. 6 only shows an output circuit 12 which can be used in conjunctions with a high side driver stage. It should, however, be understood that the present invention is not limited to a high side driver stage, but can be equally combined with a low side driver.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A circuit arrangement comprising:
   an input circuit referenced to a first ground and providing complementary input signals;
   an output circuit for operating a power semiconductor device and referenced to a second ground; and
   at least one capacitor, said capacitor including an input plate electrically connected to said input circuit and receiving one of said complementary input signals and an output plate electrically connected to said output circuit;
   further comprising another capacitor, said another capacitor comprising an input plate electrically connected to said input circuit and receiving the other of said complementary input signals and an output plate electrically connected to said output circuit;
   wherein said output circuit includes a signal biasing portion, an edge triggered signal detection portion, and a signal reconstruction portion;
   wherein said edge triggered signal detection portion detects a beginning and an end of said input signal based on reference signals generated by said signal biasing portion and generates an edge identifier signal when it detects said beginning and an edge identifier signal when it detects said end of said input signal;
   wherein said signal reconstruction portion generates an output signal based on said edge identifier signals; and
   wherein said signal reconstruction portion determines whether a change of voltage of said output plates relates to common mode noise on the input plates of said two capacitors or whether said change of voltage of said output plates relates to said complementary input signals on the input plates and wherein said signal reconstruction portion determines that said change of voltage on said output plates is due to complementary input signals on said input plates when said voltage on said output plate of said one capacitor is higher than a first reference value while said voltage on said output plate at said another capacitor is below a second reference value, and said voltage on said output plate of said one capacitor is less than said second reference value and voltage on said output plate of said another capacitor is higher than said first reference value.

2. The circuit arrangement of claim 1, wherein said signal biasing portion generates a reference signal based on an input signal into said input plate of said capacitor from said input circuit.

3. The circuit arrangement of claim 1, wherein said output circuit further comprises a blanking filter to filter out noise prior to signal reconstruction.

4. The circuit arrangement of claim 1, wherein said output circuit further comprises a buffered output portion.

5. A circuit arrangement comprising:
an input circuit referenced to a first ground and capable of generating complementary input signals;
an output circuit for operating a power semiconductor device and referenced to a second ground; and
a first capacitor, said first capacitor including an input plate electrically connected to said input circuit to receive one of said complementary input signals and an output plate electrically connected to said output circuit; and
a second capacitor, said second capacitor including an input plate electrically connected to said input circuit to receive the other one of said complementary input signals and an output plate electrically connected to said output circuit;
wherein said output circuit includes a signal biasing portion, an edge triggered signal detection portion, and a signal reconstruction portion;
wherein said signal biasing portion generates a reference signal based on a change of voltage of said output plate of said first capacitor, and a reference signal based on a change of voltage of said output plate of said second capacitor;
wherein said edge triggered signal detection portion generates an edge identifier signal based on each change of voltage of said output plates;
wherein said signal reconstruction portion generates an output signal based on said edge identifier signals; and
wherein said signal reconstruction portion determines that voltages of said output plates relate to common mode noise on the input plates of said two capacitors when voltage on said output plate of said first capacitor and voltage on said output plate of said second capacitor are below a first reference value and voltage on said output plate of said first capacitor and voltage on said output plate of said second capacitor are above a second reference value.

6. The circuit arrangement of claim 5, wherein said output circuit further comprises a blanking filter to filter out noise prior to generation of said output signal.

7. The circuit arrangement of claim 5, wherein said output circuit further comprises a buffered output portion.

8. A method for high side level shifting comprising:
capacitively coupling an input circuit referenced to a first ground voltage to an output circuit for operating a power semiconductor device and referenced to a second ground voltage, said step of capacitively coupling comprising coupling complementary input signals through two respective capacitors, each having an input plate and an output plate;
detecting a beginning of an input signal from said input circuit at said output circuit;
detecting an end of said input signal;
reconstructing an output signal based on said detecting steps;
wherein a set signal is sent to a latch circuit in response to detecting said beginning of said input signal and a reset signal is sent to said latch circuit in response to detecting said end of said input signal;
wherein said step of reconstructing an output signal comprises determining whether a change of voltage of said output plates of said two capacitors relates to common mode noise on the input plates of said two capacitors or whether said change of voltage of said output plates relates to said complementary input signals on the input plates: and wherein no output signal is reconstructed when said voltages of said output plates have a same polarity and an output signal is reconstructed when said voltages of said output plates have opposite polarities.

9. A method according to claim 8, wherein no signal is sent to said latch circuit in response to noise.

10. A method according to claim 8, wherein said output signal is sent to a driver stage of a driver circuit.

* * * * *